Figures 1, 5:
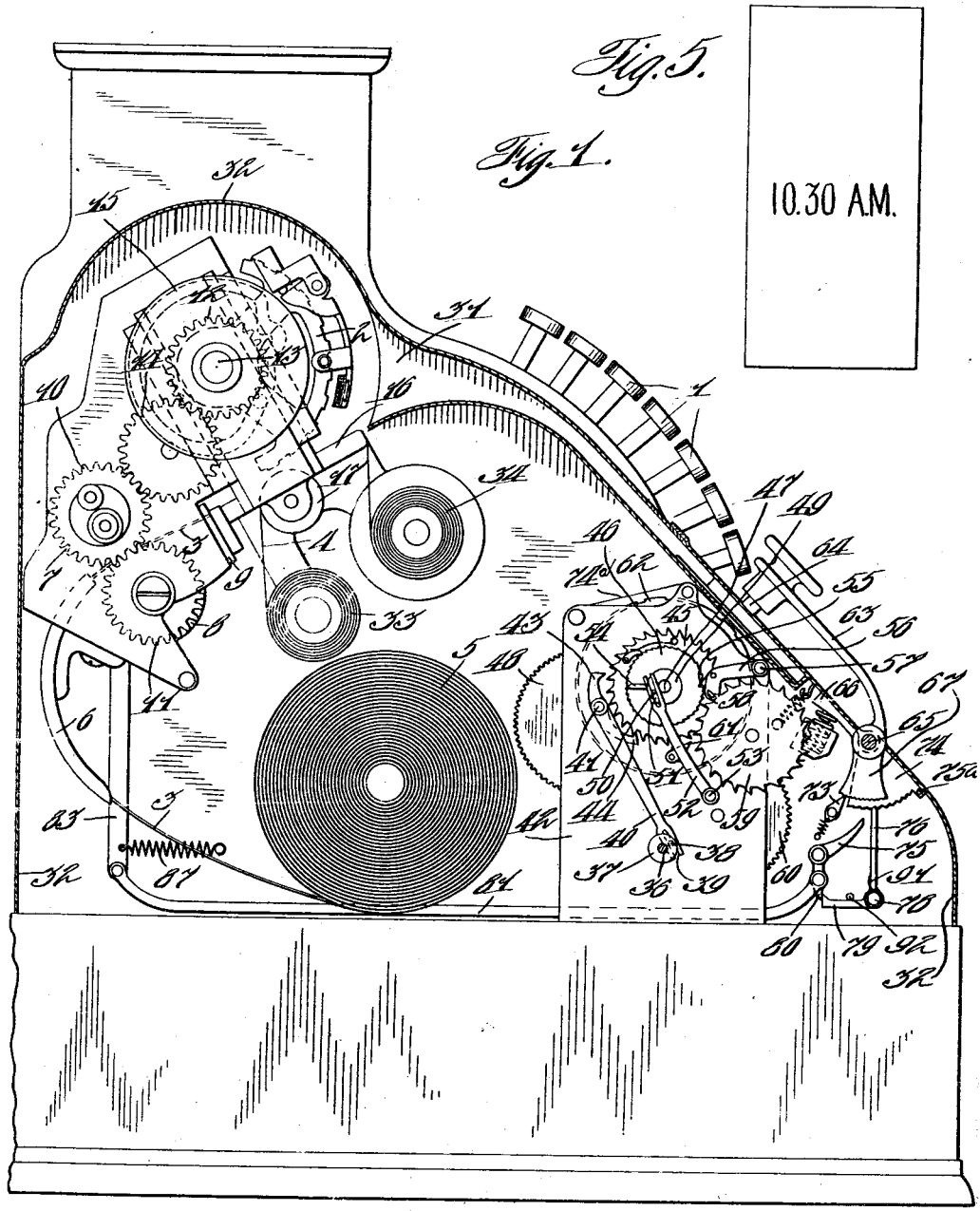

W. H. MUZZY.
CASH REGISTER.
APPLICATION FILED MAR. 19, 1908.

1,051,436.

Patented Jan. 28, 1913.

3 SHEETS—SHEET 1.

10.30 A.M.

Witnesses

Inventor

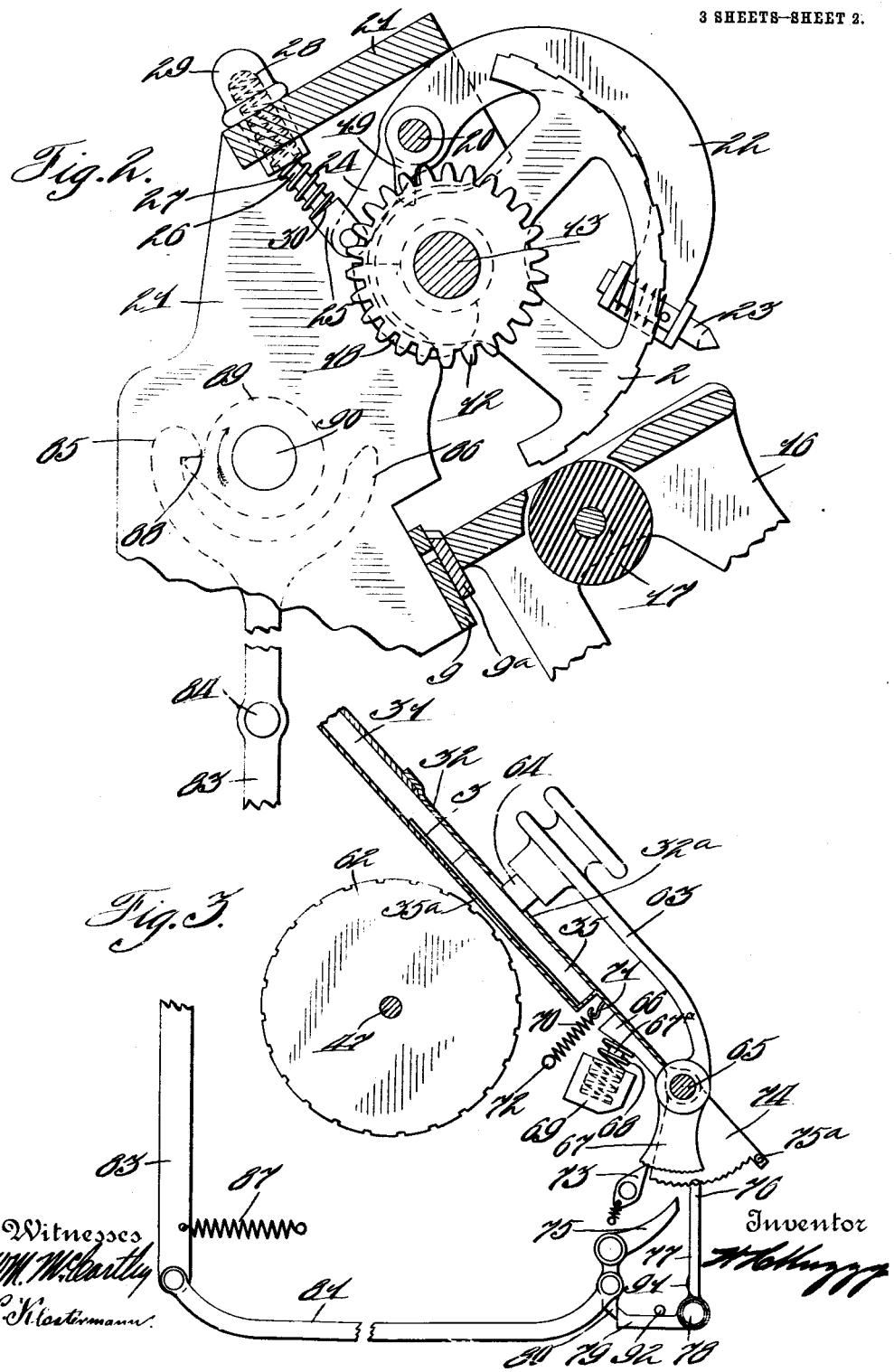

W. H. MUZZY.
CASH REGISTER.
APPLICATION FILED MAR. 19, 1908.
1,051,436.
Patented Jan. 28, 1913.
3 SHEETS—SHEET 3.
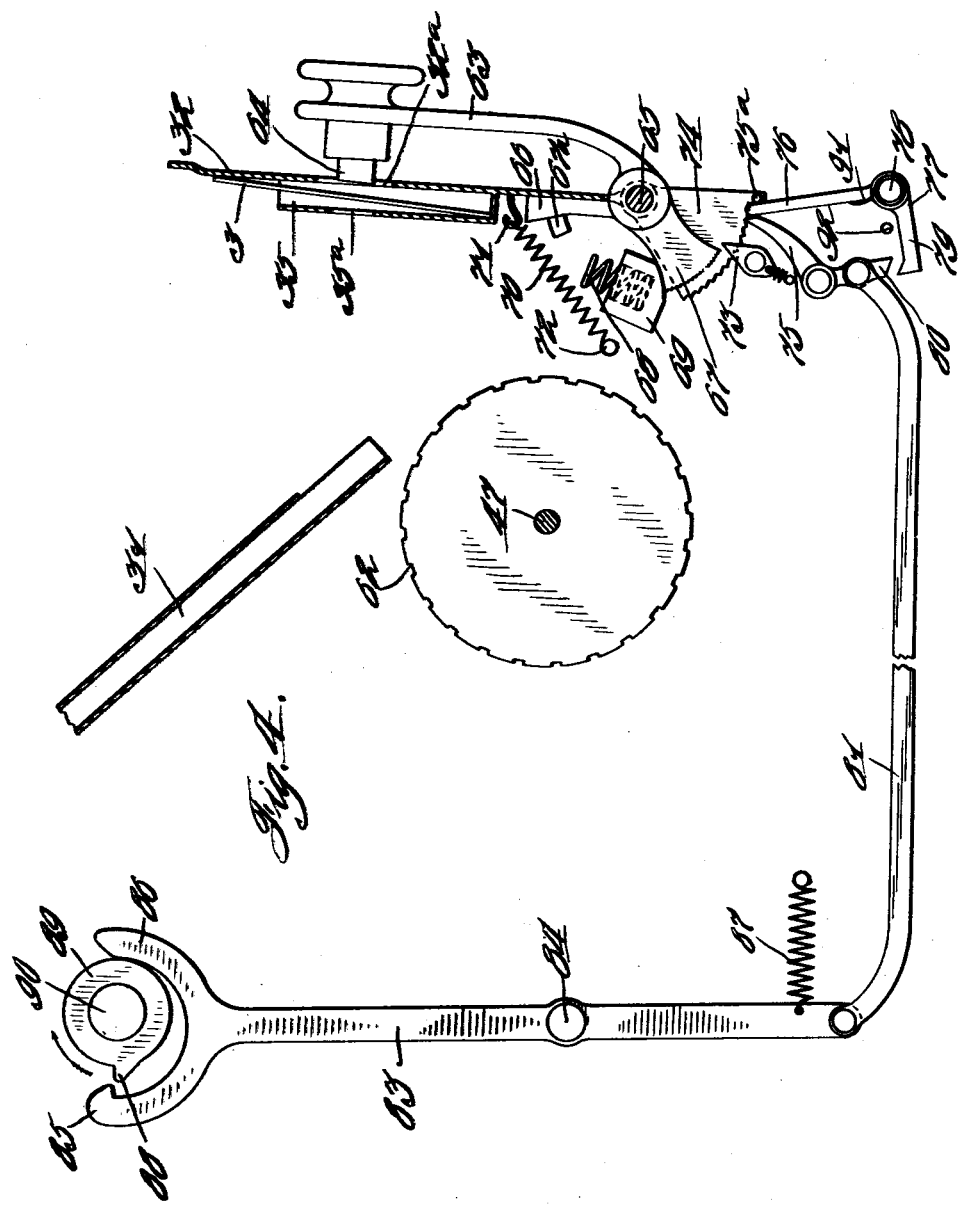
Witnesses
Inventor

UNITED STATES PATENT OFFICE.

WILLIAM H. MUZZY, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,051,436.

Specification of Letters Patent. Patented Jan. 28, 1913.

Application filed March 19, 1908. Serial No. 422,082.

*To all whom it may concern:*

Be it known that I, WILLIAM H. MUZZY, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and has more particular relation to improvements in time printing mechanisms for registers.

The principal object of this invention is to provide a cash recording mechanism with a time recording mechanism and an interlocking mechanism to compel a certain sequence of operation of said mechanisms.

With this and incidental objects in view, the invention consists in certain novel features of construction and combination of parts, the essential elements of which are set forth in appended claims and a preferred form of embodiment of which is hereinafter specifically described with reference to the drawings which accompany and form part of this specification.

Of said drawings: Figure 1 represents an end elevation partly in section of the present invention, applied to the type of machine shown in Patent No. 580,378 issued to Cleal and Reinhard; Fig. 2 represents an enlarged section illustrating the amount recording mechanism, and the check ejecting devices; Fig. 3 represents an enlarged partial section of the time recording mechanism and interlocking devices; Fig. 4 represents a view similar to Fig. 3 with the check receptacle of the time recording mechanism in a vertical position to allow the removal of the check; and Fig. 5 represents a detail view of the check with the time printed thereon.

Described in general terms, the invention comprises a cash registering and recording machine, of the type shown and described in the above mentioned patent. This mechanism prints the amount of a sale upon a check strip; severs and ejects a portion of said strip in the form of a check. The severed check in the present invention is ejected into a chute and passes into a movable receptacle formed in the lower part of the chute adjacent to a time recording mechanism, the platen of which is then operated to print the time upon the check. After the amount recording mechanism has been operated, it automatically becomes locked, and is only released by an operation of the platen of the time recording mechanism; the latter in turn is locked and is released only by the operation of the amount recording mechanism.

*Amount recording mechanism.*—The keys 1 control the amount to be recorded by the type segments 2 (only one of which is shown) upon the check and sales strips 3 and 4 respectively, as fully shown and described in the patent to Cleal and Reinhard and in a manner well known in the art. The check strip 3 is fed from a supply roll 5 through a chute 6, thence between feed rollers 7 and 8 to a stationary knife 9. The rollers 7 and 8 are provided with gears 10 and 11 respectively which mesh with each other. The gear 10 is driven by a gear 12 fastened to a rotary shaft 13 through an intermediate gear 14. A cam disk 15 is secured to the outer end of the shaft 13, and is designed to raise and lower the frame 16 carrying the platen roller 17 twice during each rotation of the shaft 13 to print the amount first upon the check strip 3 and then upon the sales strip 4; the check strip having been fed over the platen roller 17 when the frame 16 was first lowered. Simultaneously with the taking of the impression upon the check strip, a knife 9ª carried by the frame 16 will sever the check.

Attached to the gear 12 (see Fig. 2) is a segmental cam plate 18 which, during the latter part of the movement of the gear 12, contacts with a downwardly extending arm 19 secured to a short transverse shaft 20 mounted in the sides of the printer frame 21 and rocks said shaft. At its other end, the shaft 20 has secured to it a curved lever 22 which carries at its lower end a plunger pin 23. A rearwardly extending portion 24 of the lever 22 has pivoted to its extreme end a plate 25, which carries a pin 26 that is surrounded by a coil spring 27. This spring enters a recess 28 in a screw head 29 secured to the printer frame 21. The ends of the spring 27 abut against a shoulder 30 formed upon the plate 25 and the end of the recess 28, thereby holding the curved lever 22 in the position shown in Fig. 2 with the upper end of said lever contacting with a part of the printer frame 21.

It will be seen from the above that, as the gear 12 is rotated, the plate 18 carried thereby will contact with the arm 19 and rock the shaft 20, thereby carrying the lower end of the lever 22 rearwardly, so that the plunger pin 23 will be in a position to grip the check when the frame 16 is first raised by the cam disk 15 to print the amount upon the check; and as the said frame 16 is lowered, the cam plate 18 will have passed by the arm 19, allowing the spring 27, which has been previously compressed, to operate the curved lever 22 to eject the check, which passes into a chute 31 formed upon a hood 32.

The sales strip 4 is fed from a supply roll 33 over the platen roller 17 to a storage roll 34. Both of said rolls 33 and 34 are carried by the frame 16, and as said frame is raised a second time by the cam disk 15, the amount is recorded upon the sales strip 4, the strip being fed forward in a manner well known in the art.

It it to be understood that the keys 1, instead of representing amounts, may be used for any other characters, such as workmen's numbers.

*Time recording mechanism.*—The check 3, after being severed and ejected into the chute 31, rests in a receptacle 35 formed in the lower part of the chute 31, in a position to have the time stamped thereon. A shaft 36 is arranged to be driven by an ordinary clock mechanism, so as to make one revolution every two minutes. This shaft carries at one end a disk 37, which is provided with a pin 38 that plays in a slot 39 formed in the lower end of a lever 40, which is pivoted at 41 to the frame 42 of the time recording mechanism. The lever 40 carries at its pivotal point pawls 43 and 44 which coöperate with an escapement wheel 45, driven by a ratchet wheel 46, secured to a shaft 47, which in turn is driven by a motor wheel 48, all of which is fully shown and described in the patent granted to W. I. Follett, dated May 16, 1905, No. 790,045. Secured to this shaft 47 is the minute printing wheel not shown. Attached to the outer end of the shaft 47 is a disk 49, which carries a pin 50 that plays in an elongated slot 51 formed in the upper end of a lever 52 which is pivoted at 53 to the frame 42. Extending radially from the disk 49 is a pin 54 which, at each revolution of the disk 49, contacts with a pawl 55 pivoted to a lever 56, which in turn is pivoted at 57 to the frame 42, so as to disengage a lug 58, carried by the free end of the lever 56 from engagement with the teeth of an escapement wheel 59 which is driven by a motor wheel 60. The lever 52, as shown in the said patent to Follett, carries a pawl 61, which is brought into engagement with the teeth of the escapement wheel 59 just as the pin 54 disengages the lug 58 from the teeth of said escapement wheel, thereby limiting the movement of said wheel, this wheel in turn controlling the hour printing wheel 62. A hammer 63 carrying a platen 64 is pivotally mounted upon a transverse shaft 65. This hammer is provided at its pivotal point with an upwardly extending arm 66 and a downwardly extending ratchet plate 67. The arm 66 is provided with a pin 67ª which is surrounded by a coil spring 68, one end of said spring contacting with the under side of the arm 66, while the other end of said spring is seated in a cup-shaped projection 69 of the printer frame. The upper side of the arm 66 contacts with the under side of a portion of the hood 32, which carries the check receptacle 35. This portion of the hood 32 is pivoted upon the shaft 65, and is normally held in the position shown in Fig. 3 by a light coil spring 70, the ends of which are secured to a hook 71 attached to the under side of the pivotal portion of the hood 32, and to a pin 72 extending from the printer frame.

The hood 32 and the check receptacle 35 are provided with openings 32ª and 35ª respectively, through which the platen 64 of the hammer 63 passes in taking an impression upon the check 3 from the type carriers of the time recorder. A full stroke pawl 73 engages with the ratchet plate 67 and, as shown in Figs. 1 and 3, compels the pressing of the platen 64 against the type carriers to take an impression upon the check 3 before the hammer 63 may be rocked rearwardly. A suitable inking ribbon 74ª, as shown in Fig. 1, surrounds the type carriers, so that an impression of the type carriers may be made on the check.

*Unlocking mechanism.*—Figs. 1, 2 and 3 illustrate the position of the various mechanisms previously described after an operation of the amount recording machine, while Fig. 4 illustrates the position of the different parts after the time recording mechanism has been operated and the check receptacle rocked to a position so that the check may be removed. It will be seen from Figs. 1 and 3 that it is impossible to rock the hammer 63 to the right until it has been first depressed to the left, which movement allows the pawl 73 to clear the end of the ratchet plate 67. As the hammer 63 is retracted, the pawl will engage with the teeth of the ratchet plate 67 and prevent its movement in the opposite direction until the pawl has cleared the other end of said plate. This retracting movement of the hammer 63 will, by means of the arm 66, also carry the pivotal portion of the printer hood 32 with it. The pivotal portion of the printer hood is provided with a segmental ratchet plate 74 with which a pivoted pawl 75 is arranged to engage.

As the hammer 63 nears the end of its retracting movement, a pin 75ª, extending laterally from the plate 74, contacts with a 73(?)

vertical arm 76 of a bell crank 77 pivoted at 78 to the printer frame and rocks a horizontal arm 79 of said bell crank out of engagement with a downwardly extending arm 80 of the pawl 75. A link 81 connects the arm 80 to the lower end of a lever 83, pivoted at 84, to the side frame of the machine. The upper end of the lever 83 is bifurcated, the arm 85 of the bifurcated portion being hook-shaped and the arm 86 beveled.

When the bell crank 77 is rocked by the pin 75ª contacting with the arm 76, thereby withdrawing the arm 79 of said bell crank out of engagement with the arm 80, a spring 87, one end of which is connected to the lower end of the lever 83 and the other end attached to a pin projecting from the machine frame, will rock the pawl 75 into engagement with the teeth of the ratchet plate 74, and also withdraw the hook arm 85 of the bifurcated portion of the lever 83 out of engagement with a cam shoulder 88 formed upon a disk 89, secured to a shaft 90, as shown in Fig. 4. The hammer 63 may now be returned to normal position, but it cannot again be retracted until the amount recording machine has been operated, because of the engagement of pawl 75 with the teeth of the ratchet plate 74. This pawl is withdrawn from engagement with said plate upon the succeeding operation of the amount recording devices by the cam shoulder 88 contacting with the beveled arm 86 of the lever 83, thereby withdrawing the pawl 75 out of engagement with the teeth of the ratchet plate 74, through means of the link 81 and the arm 80, in which position it will be latched by the arm 79 of the bell crank 77 being drawn in front of the arm 80 by coil spring 91 which surrounds the pivotal point 78 of said bell crank. A pin 92 limits the upward movement of the arm 79. The shafts 13 and 90 correspond to the shafts E and G of the said Cleal and Reinhard patent.

From the preceding description it will be clear that although the amount recording mechanism and the time printer are operated independently, there are nevertheless controlling devices present which compel alternate operation of the two mechanisms. In the position of Fig. 2, the register has been operated and is locked against further movement, but the time recorder may be operated to imprint the time on check 3 which (Fig. 3) has been projected into chute 35 by the register operation. The stamp lever 65 can be given only one complete operation as it then becomes locked by pawl 75, but the locking movement of pawl 75 releases the register mechanism so that the latter may again be operated. Thus the stamping of the time on every issued check is assured.

While the form of device here shown and described is admirably adapted to fulfil the objects primarily stated, it is to be understood that it is not desired to confine the invention to one form of embodiment here disclosed, for it is susceptible of embodiment in various forms, all coming within the scope of the claims which follow.

What is claimed is:

1. The combination with a recording mechanism, of time printing devices independently operated, and controlling means intermediate said printing devices and recording mechanism.

2. The combination with a recording mechanism, of time printing devices independently operated, and means governed by the recording mechanism for controlling the time printing devices.

3. The combination with a recording mechanism, of time printing devices distinct therefrom, and means governed by the latter for controlling the former.

4. The combination with a recording mechanism, of time printing devices, and an interlocking mechanism to compel a sequence of operation of said recording mechanism and time printing devices.

5. The combination with an amount recording mechanism, including a check strip, of time printing devices, means governed by the latter for controlling the former, and means for delivering the check strip from the amount recording mechanism to the time printer.

6. The combination with an amount recording mechanism, of an operating mechanism therefor, means for automatically locking the latter after each operation, a time printer, and means controlled by the time printer for unlocking the operating mechanism.

7. The combination with an amount recording mechanism, of an operating mechanism therefor, means for automatically locking the latter after each operation, a time printer including an impression hammer, and means controlled by the hammer for unlocking the operating mechanism.

8. The combination with an amount recording mechanism, of an operating mechanism therefor, means for automatically locking the latter after each operation, a time printer, including an impression hammer, and interlocking devices to compel a sequence of operation of the operating mechanism and the impression hammer.

9. The combination with an amount recording mechanism, including a check strip, of an operating mechanism therefor, a time printer, including an impression hammer, means controlled by the operating mechanism for severing and delivering a portion of the check strip from the amount recording mechanism to the time printer, and means controlled by the hammer of the time printer for taking an impression upon the severed portion of the strip and then carrying it to a position to be grasped.

10. The combination with an amount recording mechanism, including a check strip, of a time printer, including type carriers and an impression hammer, a check receptacle located between the type carriers and impression hammer, and an operating mechanism for severing and delivering a portion of the check strip from the amount recording mechanism to the receptacle.

11. The combination with an amount recording mechanism, including a check strip, of a time printer, including type carriers and an impression hammer, a check receptacle located between the type carriers and impression hammer of the time printer, an operating mechanism for severing and delivering a portion of the check strip from the amount recording mechanism to the receptacle, and means controlled by the hammer of the time printer for taking an impression upon the severed portion of the strip and then carrying the receptacle containing the check to a position in which the latter may be grasped.

12. The combination with an amount recording mechanism, including a check strip, of an operating mechanism therefor, a time printer, means controlled by the operating mechanism for recording the amount upon one side of the check strip, then severing and delivering it to the time printer to have the time printed upon the opposite side of the check from that upon which the amount is recorded.

13. The combination with a cash register, of time printing devices, and connecting mechanism for compelling alternate operations of the register and the time printer.

14. The combination with a cash register, of time printing devices, means for locking the register after it has been operated, and mechanism for unlocking the register by the operation of the printing devices.

15. The combination with a cash register, of time printing devices, means for locking the latter after they are operated, and mechanism for unlocking said time printing devices by the operation of the register.

16. The combination with a cash register, of time printing devices, including type wheels, a clock movement controlling the same, an impression hammer, means for locking the hammer after it is operated, and mechanism for unlocking the hammer by the operation of the register.

17. The combination with a cash register, of time printing devices, including type wheels and a clock mechanism controlling the same, an impression hammer, a check receptacle movable with the hammer, means for locking the check receptacle after the hammer is operated, and mechanism for unlocking the check receptacle by the operation of the register.

18. The combination with a recording mechanism and means for operating the same, of time printing devices and operating means therefor, and mechanism governed by either of the operating means for controlling the other operating means.

19. The combination with mechanisms for recording amounts and the time, of independent operating means for said recording mechanisms, and means for compelling alternate operations of the operating means.

20. The combination with time and amount recording mechanisms, of independent operating means for said recording mechanisms, and interlocking devices between the operating means for compelling alternate operations of the operating means.

21. In a machine of the class described, the combination with a recording mechanism, and a time printing mechanism successively operated, of locking devices for each mechanism each locked by the operation of its respective mechanism and unlocked by the operation of the other mechanism.

22. In a machine of the class described, the combination with a recording mechanism, of a time printing mechanism, means for printing in succession from each of said mechanisms upon a check, the construction being such as to render necessary the removal of a completely printed check from the mechanism last operating before the succeeding check may be printed upon by said last mentioned mechanism.

23. In a machine of the class described, the combination with a recording mechanism, of a time printing mechanism, means for printing in succession from each of said mechanisms upon a check, the construction being such as to render necessary the removal of a completely printed check from the mechanism last operating thereon before the succeeding check may be printed upon by said last mentioned mechanism, and to prevent such removal before the last operating printing mechanism has been operated.

In testimony whereof I affix my signature in the presence of two witnesses.

WILLIAM H. MUZZY.

Witnesses:
R. W. FAIRCHILD,
CHAS. A. DREES.